US010859895B2

(12) United States Patent
Shimamura et al.

(10) Patent No.: US 10,859,895 B2
(45) Date of Patent: Dec. 8, 2020

(54) PROJECTOR APPARATUS

(71) Applicants: THK CO., LTD., Tokyo (JP); NEC DISPLAY SOLUTIONS, LTD., Tokyo (JP)

(72) Inventors: Marie Shimamura, Tokyo (JP); Jun Hirota, Tokyo (JP); Hajime Fukushima, Tokyo (JP); Kunitaka Furuichi, Tokyo (JP)

(73) Assignees: THK CO., LTD., Tokyo (JP); NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/474,223

(22) PCT Filed: Nov. 2, 2017

(86) PCT No.: PCT/JP2017/039769
§ 371 (c)(1),
(2) Date: Jun. 27, 2019

(87) PCT Pub. No.: WO2018/135090
PCT Pub. Date: Jul. 26, 2018

(65) Prior Publication Data
US 2019/0353991 A1 Nov. 21, 2019

(30) Foreign Application Priority Data

Jan. 17, 2017 (JP) .................. 2017-006025

(51) Int. Cl.
 *G03B 21/14* (2006.01)
 *H04N 5/74* (2006.01)
(52) U.S. Cl.
 CPC ......... *G03B 21/142* (2013.01); *G03B 21/145* (2013.01); *H04N 5/74* (2013.01)

(58) Field of Classification Search
CPC ...... G03B 21/14; G03B 21/53; G03B 21/142; G03B 21/145; H04N 9/317; H04N 9/3141
See application file for complete search history.

(56) References Cited

U.S. PATENT DOCUMENTS

2005/0117127 A1* 6/2005 Jang .................. G03B 5/02
 353/100
2011/0235002 A1* 9/2011 Hsieh ................ G03B 21/147
 353/101

(Continued)

FOREIGN PATENT DOCUMENTS

JP 9-222665 A 8/1997
JP 2002-124801 A 4/2002

(Continued)

OTHER PUBLICATIONS

International Search Report dated Feb. 6, 2018, issued in counterpart application No. PCT/JP2017/039769 (2 pages).

*Primary Examiner* — Sultan Chowdhury
(74) *Attorney, Agent, or Firm* — Westerman, Hattori, Daniels & Adrian, LLP

(57) ABSTRACT

A projector apparatus that can effectively reduce bending of a base plate supporting a lens shifting unit thereon and facilitates replacement of unit parts in the event of a failure is provided. The projector apparatus includes: a base plate attached inside a projector body; a lens supporting unit attached to the base plate and supporting a projection lens so as to be movable relative to the base plate; guiding mechanisms for guiding the lens supporting unit so as to be freely movable in a horizontal direction and a normal direction relative to the base plate; and fixing devices which fix the base plate to the projector body. The fixing devices include a plurality of first fixing devices provided at a peripheral (Continued)

edge of the base plate, and second fixing devices provided on an inner side of the plurality of first fixing devices.

4 Claims, 10 Drawing Sheets

(56) References Cited

U.S. PATENT DOCUMENTS

| | | |
|---|---|---|
| 2011/0310364 A1 | 12/2011 | Wakabayashi |
| 2012/0218527 A1* | 8/2012 | Hatakeyama .......... G03B 21/54 353/101 |
| 2012/0249979 A1* | 10/2012 | Morikuni ............... G03B 21/62 353/70 |
| 2012/0327377 A1 | 12/2012 | Ohsugi |
| 2013/0265551 A1* | 10/2013 | Yamano ............... H04N 13/363 353/30 |
| 2014/0036237 A1* | 2/2014 | Kadotani ............... H04N 9/317 353/31 |
| 2014/0300829 A1 | 10/2014 | Ueoka et al. |

FOREIGN PATENT DOCUMENTS

| | | |
|---|---|---|
| JP | 2004-4206 A | 1/2004 |
| JP | 4545471 B2 | 9/2010 |
| JP | 2011-158657 A | 8/2011 |
| JP | 2012-8185 A | 1/2012 |
| JP | 2013-8555 A | 1/2013 |
| WO | 2013/054427 A1 | 4/2013 |

* cited by examiner

PROJECTOR APPARATUS

TECHNICAL FIELD

The present invention relates to a projector apparatus.

BACKGROUND ART

Projector apparatuses that magnify and project a picture or image on a display device onto a projection surface, such as a screen, via a projection lens with light emitted by a light source device are known.

Since such a projector apparatus requires an image or the like to be projected at an accurate position on the projection surface, it includes a lens shifting unit for adjusting a projection position by moving the position of the projection lens in the horizontal or vertical direction (Patent Literature 1).

A lens shifting unit of this kind includes a base plate and is attached to a casing of the projector apparatus by using fasteners, such as screws, at the peripheral edge of the base plate.

More recently, lenses larger than those of general projector apparatuses for household use have been employed in projector apparatuses used for projection mapping, which displays an image on a building or an object, or in a space.

CITATION LIST

Patent Literature

[Patent Literature 1] Japanese Patent No. 4545471

DISCLOSURE OF THE INVENTION

Problems to be Solved by the Invention

When a large lens is supported by a lens shifting unit, a base plate used for attaching the lens shifting unit to a projector body is likely to undergo bending because a larger lens has a larger mass. For reduction of such bending, the number of fixing locations has to be increased; however, positions to attach fasteners are restricted in a limited space.

In addition, while a lens shifting unit can be moved from a home position in three directions, namely X, Y, and Z axes, the fasteners are hidden by components of the lens shifting unit in a situation where the lens shifting unit is moved from the home position, making replacement of parts of the lens shifting unit difficult.

The present invention was made in order to solve the above challenge and an object thereof is to provide a projector apparatus that enables effective reduction in bending of a base plate supporting a lens thereon and that facilitates replacement of unit parts.

Means for Solving the Problems

A projector apparatus according to the present invention includes: a base plate attached inside a projector body; a lens supporting unit attached to the base plate and supporting a projection lens so as to be movable relative to the base plate; guiding mechanisms for guiding the lens supporting unit so as to be freely movable in a horizontal direction and a vertical direction relative to the base plate; and fixing devices which fix the base plate to the projector body. The fixing devices include a plurality of first fixing devices provided at a peripheral edge of the base plate, and second fixing devices provided on an inner side of the plurality of first fixing devices.

Effects of the Invention

The present invention can effectively reduce the bending of the base plate that occurs when a large lens is used since the lens shifting unit is fixed to the projector body by providing fixing devices at the peripheral edge and the inner side of the base plate.

MODE FOR CARRYING OUT THE INVENTION

An embodiment of a projector apparatus according to the present invention is described below with reference to the drawings. It is noted that the following embodiment is not intended to limit the subject matters set forth in the claims and not all of the combinations of features described in the embodiment are essential for the solution of the invention.

Figure 1:
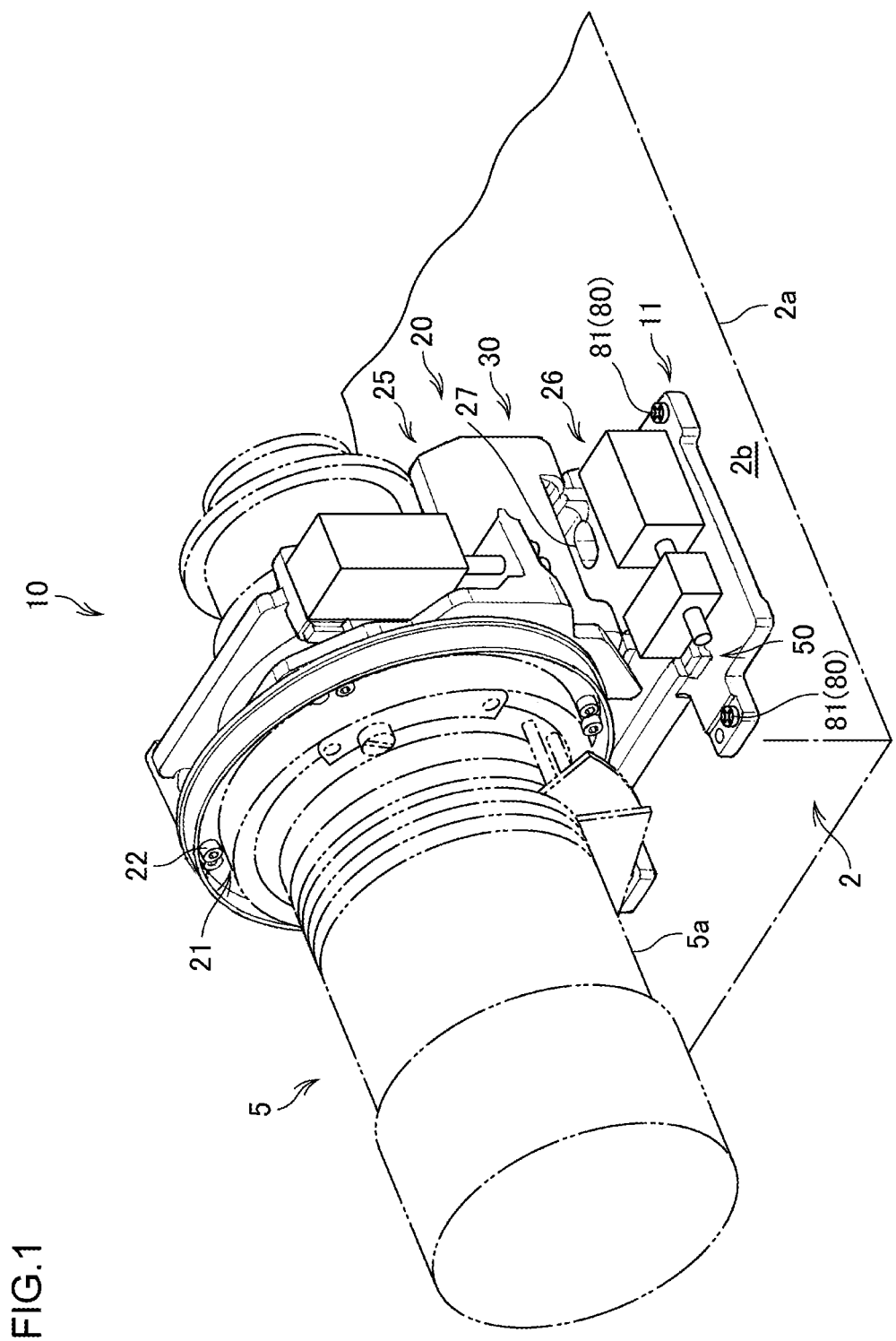
FIG. 1 is a perspective view showing how a lens is mounted to a lens shifting unit of a projector apparatus according to an embodiment of the present invention.
Figure 2:
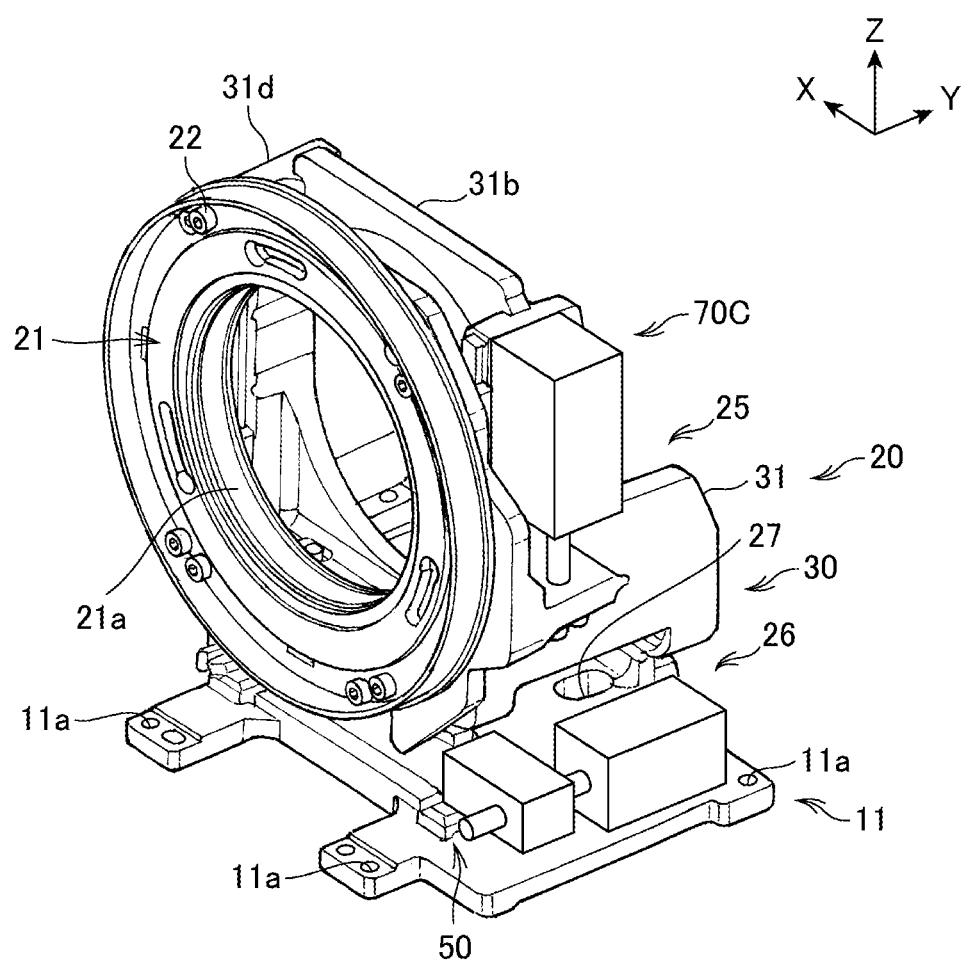
FIG. 2 is a perspective view for describing a structure of the lens shifting unit of the projector apparatus according to the embodiment.
Figure 3:
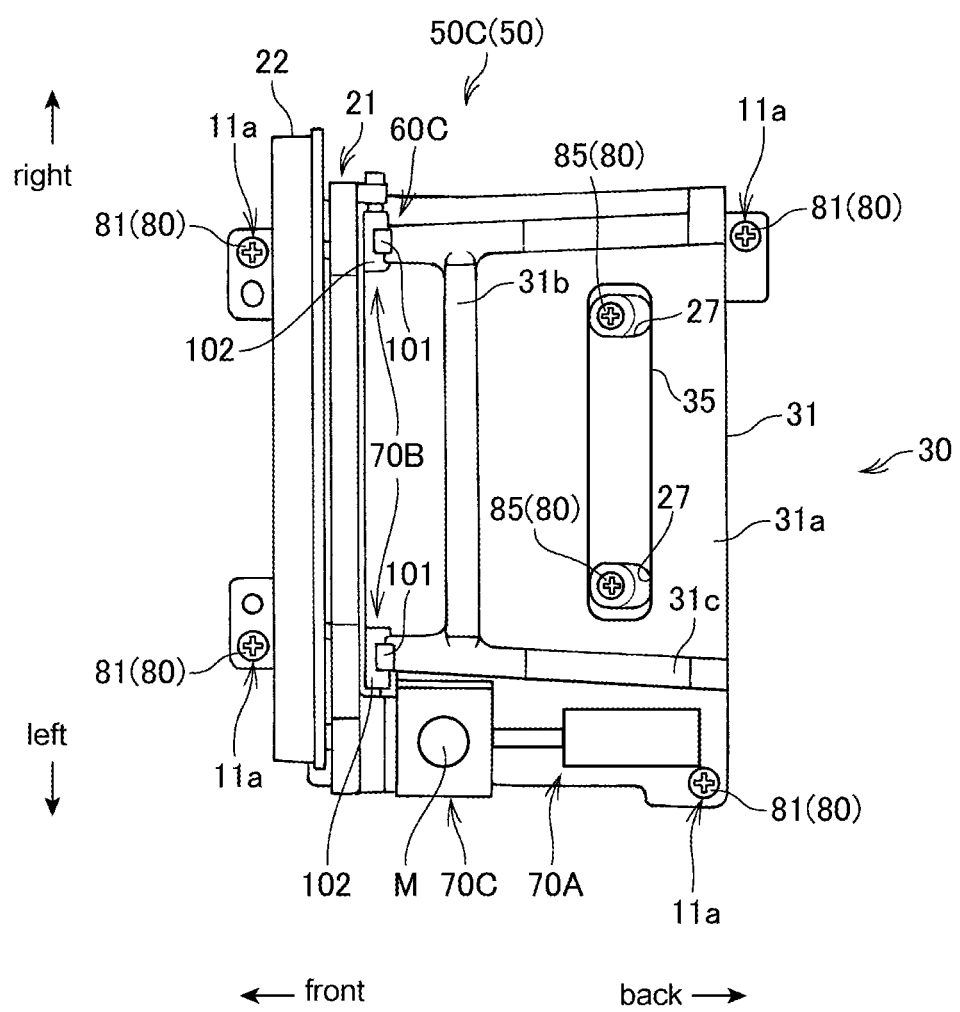
FIG. 3 is a plan view of the lens shifting unit of the projector apparatus according to the embodiment as mounted on a projector body.
Figure 4:
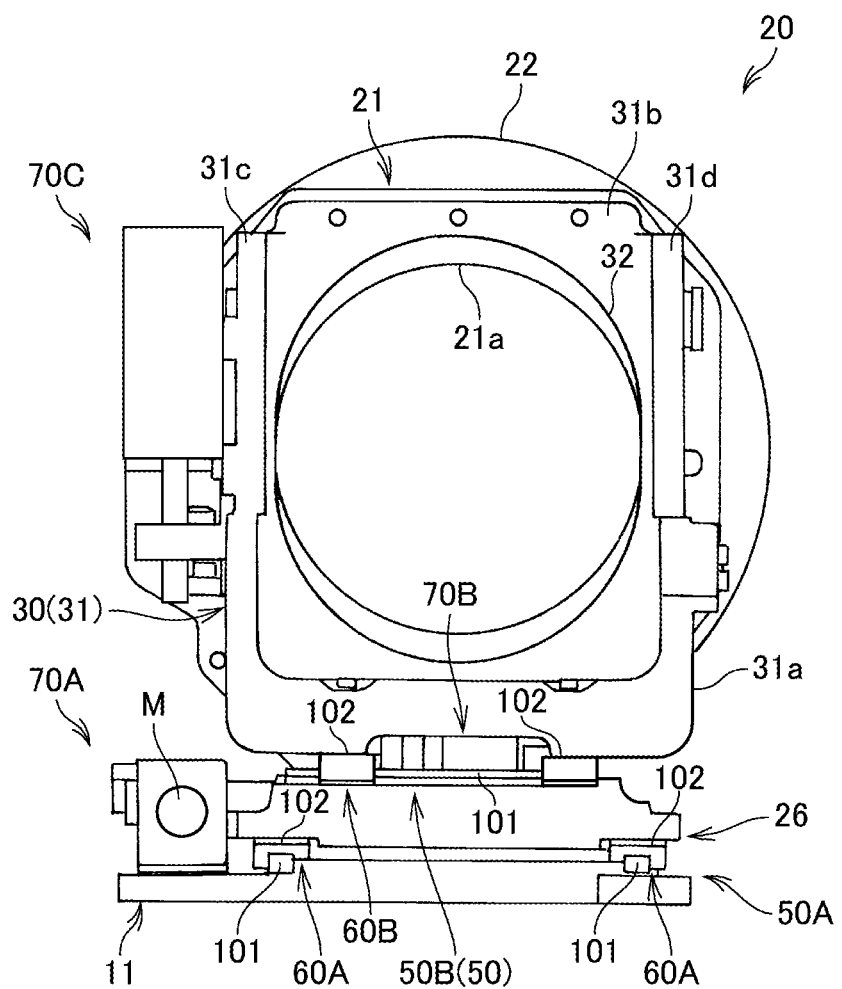
FIG. 4 is a rear view of the lens shifting unit of the projector apparatus according to the embodiment.
Figure 5:
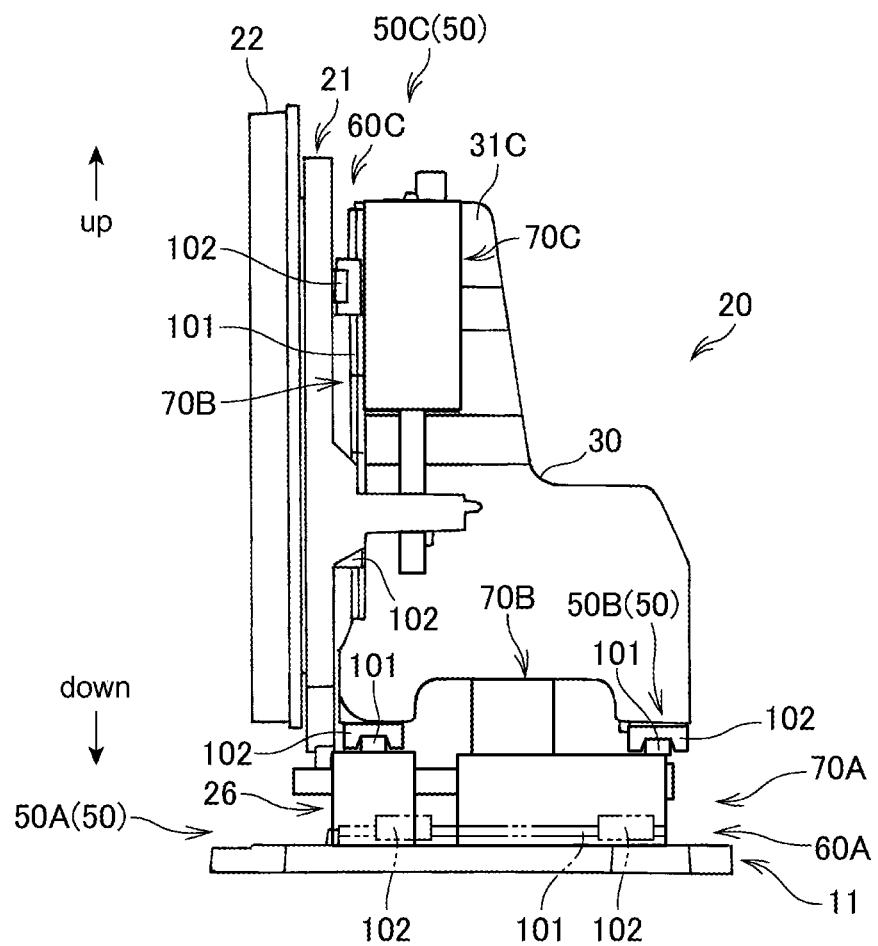
FIG. 5 is a side view of the lens shifting unit of the projector apparatus according to the embodiment.
Figure 6:
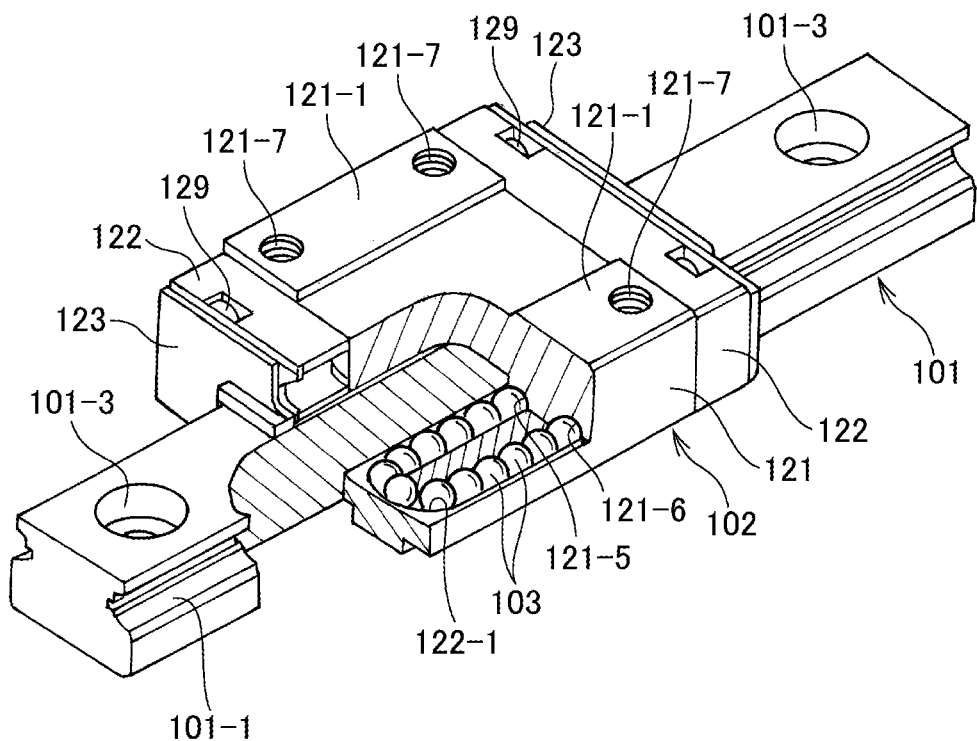
FIG. 6 is a partially cutaway perspective view of relevant portions of a linear guiding unit.
Figure 7:
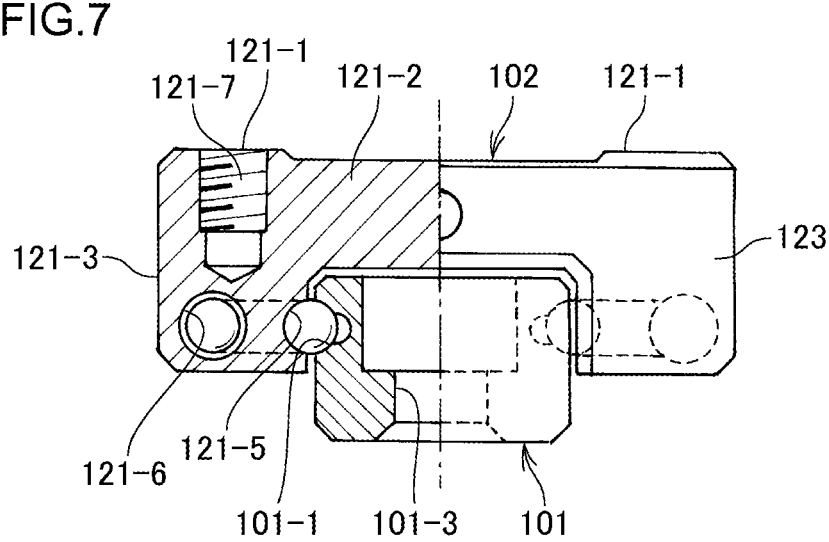
FIG. 7 is a partially cutaway cross-sectional view of the linear guiding unit of FIG. 6.
Figure 8:
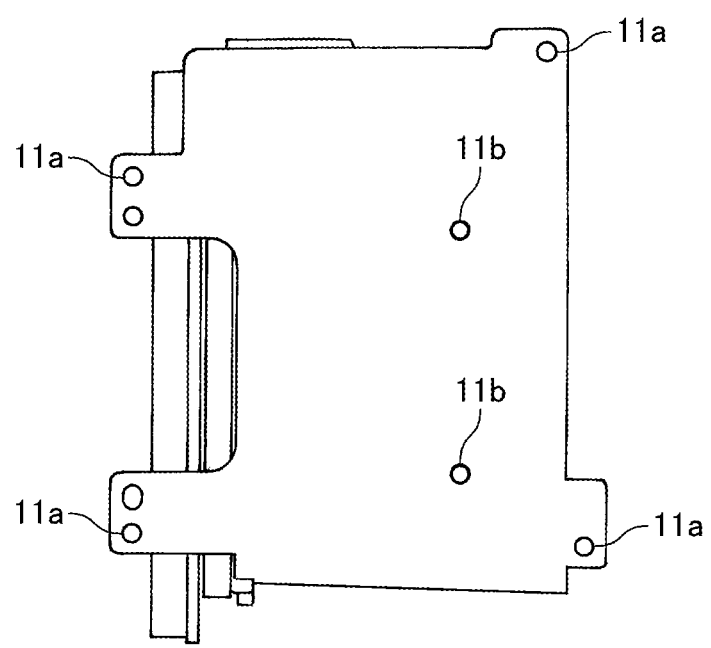
FIG. 8 is a bottom view of the lens shifting unit of the projector apparatus according to the embodiment.
Figure 9:
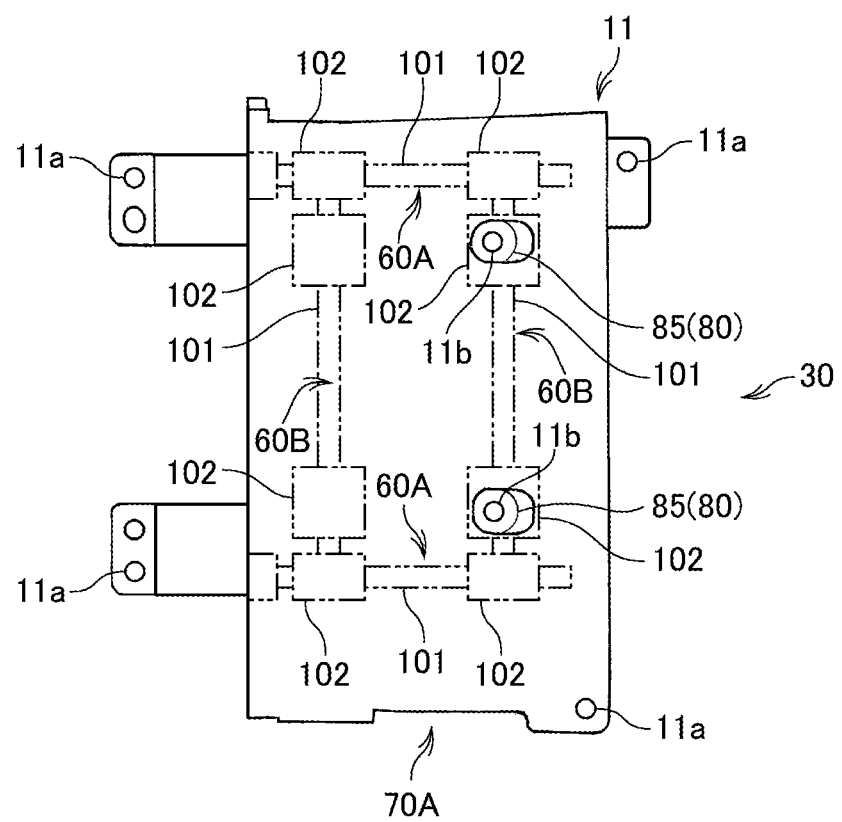
FIG. 9 is a plan view showing the placement positions of second through-holes formed in a base plate.

FIG. 1 is a perspective view showing how a lens is mounted to a lens shifting unit of a projector apparatus according to an embodiment of the present invention; FIG. 2 is a perspective view for describing the structure of the lens shifting unit of the projector apparatus according to the embodiment; FIG. 3 is a plan view of the lens shifting unit of the projector apparatus according to the embodiment as mounted on a projector body; FIG. 4 is a rear view of the lens shifting unit of the projector apparatus according to the embodiment; FIG. 5 is a side view of the lens shifting unit of the projector apparatus according to the embodiment; FIG. 6 is a partially cutaway perspective view of relevant portions of a linear guiding unit; FIG. 7 is a partially cutaway cross-sectional view of the linear guiding unit of FIG. 6; FIG. 8 is a bottom view of the lens shifting unit of the projector apparatus according to the embodiment; FIG. 9 is a plan view showing the placement positions of second through-holes formed in a base plate; and FIGS. 10 and 11 show an example of FEM analysis of the amount of displacement of components associated with the fixing form of the lens shifting unit.

In the following description, for the sake of convenience, the up/down direction in FIG. 3 is referred to as X-axis (horizontal) direction; the left/right direction (optical axis direction) in FIG. 3 is as Y-axis (horizontal) direction; and the up/down direction in FIG. 2 is as Z-axis (normal) direction. Also, in the description, the up/down direction in FIG. 3 is referred to as the left/right direction of the projector apparatus; the left/right direction in FIG. 5 is as the front/back direction of the projector apparatus; and the up/down direction in FIG. 5 is as the up/down direction of the projector apparatus.

As shown in FIG. 1, the projector apparatus according to an embodiment includes a projector body 2 and a projection lens (hereinafter referred to as "lens 5") which can be attached to and detached from the projector body 2. The lens 5 includes a lens barrel 5a housing multiple lens groups therein and is replaceable as appropriate. The lens 5 also includes a focus ring and a zoom ring, by rotation of which the focus and size of an image or the like projected on a projection surface are adjusted.

The projector apparatus according to this embodiment is utilized as a projector apparatus used for projection mapping, which displays an image onto a building or an object, or in a space, for example, and it employs a large lens having a larger mass than that of a lens used in a general, household-use projector apparatus for projecting an image or the like onto a screen.

The projector body 2 has a casing 2a, for example, as shown in FIG. 1, with a display device, not illustrated, optical units including a light source device, and a lens shifting unit 10 for positional adjustment of the lens being accommodated in the casing 2a. The lens 5 is detachably attached to the lens shifting unit 10.

The projector apparatus then magnifies and projects an image or the like on the display device onto a projection surface, such as a building, an object, or a space, via the lens 5 with light emitted from the light source device.

The lens shifting unit 10 is supported such that the lens 5 is movable relative to the base plate 11, and includes the base plate 11 which is fixed to a bottom surface 2b of the casing 2a, a lens supporting mechanism 20 (a lens supporting unit of the present application) which supports the lens 5 in a movable manner, and a guiding drive mechanism 50 (a guiding mechanism of the present application) which guides the lens supporting mechanism 20 so as to be freely movable in predetermined directions relative to the base plate 11, as shown in FIGS. 1 and 2.

As shown in FIG. 2, the lens supporting mechanism 20 includes a lens holding plate 21 which fixedly holds the lens 5, and an intermediate unit 25 provided between the lens holding plate 21 and the base plate 11.

The lens holding plate 21 has an insertion hole 21a of a substantially circular shape in front view, as shown in FIG. 2. The lens 5 is inserted into the insertion hole 21a and attached via supporting of a part of the lens 5 with a fastener or the like, not illustrated. On the outer surface of the insertion hole 21a, an outwardly projecting flange portion 22 is formed.

As shown in FIGS. 2 and 3, the intermediate unit 25 includes a first intermediate member 26 which moves the lens 5 in the Y-axis direction relative to the base plate 11 and a second intermediate member 30 which moves the lens 5 in the X-axis direction relative to the base plate 11.

The first intermediate member 26 is a member formed in a substantially flat plate shape along an X-Y plane, for example, has approximately the same size as the base plate 11, and is positioned overlapping with the base plate 11.

The second intermediate member 30 has a frame component 31 reinforced for supporting the lens 5. The frame component 31 is positioned overlapping with the first intermediate member 26 and has a bottom wall portion 31a formed substantially in the shape of a flat plate having approximately the same size as the first intermediate member 26 and along the X-Y plane, and a front wall portion 31b and two side wall portions 31c, 31d standing on the front and opposite sides of the bottom wall portion 31a, respectively.

The front wall portion 31b has a through-hole 32 for insertion of the lens 5 as shown in FIG. 4, the through-hole 32 being formed in an ellipsoidal shape with its longer axis in the normal direction. The front wall portion 31b is positioned behind the lens holding plate 21, and the through-hole 32 formed in the front wall portion 31b is positioned coaxially with the insertion hole 21a formed in the lens holding plate 21 so that the front wall portion 31b can be shifted in the up/down direction without interfering with the lens 5 when the lens 5 is attached.

As shown in FIGS. 4 and 5, the guiding drive mechanism 50 includes first to third guiding drive mechanisms 50A-50C for moving the lens 5 in the normal (Z-axis) and horizontal (X-axis and Y-axis) directions.

The first guiding drive mechanism 50A has a linear guiding unit 60A and a driving unit 70A. Included as the linear guiding unit 60A are, as shown in FIG. 6, a track rail 101 as a track member, a movement block 102 as a movement member incorporated so as to be capable of motion relative to the track rail 101, and multiple balls 103 as rolling elements which are housed in array within an endless circulating path provided in the movement block 102 and which roll between the track rail 101 and the movement block 102 while receiving a load, for example. In this case, two movement blocks 102 are incorporated for one track rail 101 at the front and the back.

The track rail 101 is formed such that its cross section perpendicular to the longitudinal direction is of a substantially rectangular shape, and rolling element rolling surfaces 101-1 are formed along the longitudinal direction at the opposite sides in the width direction of the track rail 101. Here, a total of two strips of rolling element rolling surfaces 101-1 are formed, one for each side of the width direction. The number and positioning of the rolling element rolling surfaces 101-1 may be modified as appropriate. In the track rails 101, insertion holes 101-3 for insertion of fasteners (not shown) are formed as appropriate along the longitudinal direction of the track rails 101 at certain intervals. In this embodiment, the track rails 101 are fastened to the base plate 11 via the insertion holes 101-3.

Meanwhile, the movement block 102 mentioned above is formed such that its cross section perpendicular to the movement direction is substantially squared U-shaped, and is disposed so as to straddle the track rail 101. A pair of end seals 123 for sealing a clearance between the movement block 102 and the track rail 101 from the outside are mounted on a block body 121 and on a pair of end plates 122 fixed to the end faces of the block body 121 in the movement direction.

As shown in FIG. 7, the block body 121 has a horizontal portion 121-2 with an attachment surface 121-1, and a pair of sleeve portions 121-3 hanging down from the opposite ends of the horizontal portion 121-2. A loaded rolling element rolling groove 121-5 corresponding to the rolling element rolling surface 101-1 of the track rail 101 is provided on the inner surface of each sleeve portion 121-3. Also in each sleeve portion 121-3, a rolling element return path 121-6 is bored in parallel with the loaded rolling element rolling groove 121-5.

In the horizontal portion 121-2, tap holes 121-7 into which bolts (not shown) for fastening the block body 121 are to be screwed are formed. In this embodiment, the horizontal portion 121-2 is fastened to the first intermediate member 26 via the tap holes 121-7.

A direction changing path 122-1 for the balls 103 is formed in the pair of end plates 122. Upon mounting of the end plates 122 to the opposite end faces of the block body 121 with bolts 129, the loaded rolling element rolling groove 121-5 of the block body 121 and the rolling element return path 121-6 are coupled in communication with each other by the direction changing path 122-1, thus forming an endless circulating path.

As mentioned previously, the balls 103 are housed in array within this endless circulating path and circulate in response to relative motion of the track rail 101 and the movement block 102. The balls 103 then roll between the rolling element rolling surface 101-1 of the track rail 101 and the loaded rolling element rolling groove 121-5 of the movement block 102 while receiving a load.

The linear guiding unit 60B of the second guiding drive mechanism 50B and the linear guiding unit 60C of the third guiding drive mechanism 50C shown in FIGS. 4 and 5 have also a similar structure to the linear guiding unit 60A of the first guiding drive mechanism 50A, and figures showing their details and descriptions are omitted.

Then, as shown in FIGS. 5 and 9, in the linear guiding unit 60A of the first guiding drive mechanism 50A, the track rails 101 are fixed at the right and left of the base plate 11 so as to extend in the front/back direction, the movement blocks 102 are fixed at the front and rear of the first intermediate member 26 respectively, and the first intermediate member 26 is coupled to the base plate 11 in a state that allows the first intermediate member 26 to be guided in the Y-axis direction.

Likewise, as shown in FIGS. 4 and 9, in the linear guiding unit 60B of the second guiding drive mechanism 50B, the track rails 101 are fixed at the front and rear of the first intermediate member 26 so as to extend in the left/right direction, the movement blocks 102 are fixed on the right and left of the second intermediate member 30 respectively, and the second intermediate member 30 is coupled to the first intermediate member 26 in a state that allows the second intermediate member 30 to be guided in the X-axis direction.

Likewise, as shown in FIGS. 3 and 5, in the linear guiding unit 60C of the third guiding drive mechanism 50C, the track rails 101 are fixed on the right and left of the second intermediate member 30 so as to extend in the up/down direction, the movement blocks 102 are fixed at the right and left of the lens holding plate 21 respectively, and the lens holding plate 21 is coupled to the second intermediate member 30 in a state that allows the lens holding plate 21 to be guided in the Z-axis direction.

In this manner, the projector apparatus of this embodiment allows the lens 5 to be freely moved in the X-, Y-, and Z-axis directions relative to the base plate 11, permitting positional adjustment of the lens 5.

As shown in FIG. 4, the driving unit 70A has an electric motor M as a driving source, feed screw devices positioned within the housing though not shown, and a transmission mechanism for transmitting the rotation of the electric motor to the feed screw devices. The feed screw devices are mounted in a state that allows them to freely rotate about their axes but prevents them from moving in the up-down or left/right direction.

Then, in the first guiding drive mechanism 50A, the driving unit 70A is attached on the base plate 11 and the terminating end of the feed screw device is fixed to the first intermediate member 26, so that the first intermediate member 26 is moved in the Y-axis direction by applying driving force in the Y-axis direction to the first intermediate member 26.

Likewise, as shown in FIG. 4, in the second guiding drive mechanism 50B, the driving unit 70B is attached on the first intermediate member 26 and the terminating end of the feed screw device is fixed to the second intermediate member 30, so that the second intermediate member is moved in the X-axis direction by applying driving force in the X-axis direction to the second intermediate member.

Likewise, as shown in FIG. 5, in the third guiding drive mechanism 50C, the driving unit 70C is attached to the side wall portion 31c of the second intermediate member 30 and the terminating end of the feed screw device is fixed to the lens holding plate 21, so that the lens holding plate 21 is moved in the Z-axis direction by applying driving force in the Z-axis direction to the lens holding plate 21.

The lens shifting unit 10 described above is fixed to the bottom surface 2b of the casing 2a via the base plate 11 by multiple fixing components 80 (fixing devices of the present application) as shown in FIGS. 1 and 3. The fixing components 80 include multiple first fasteners 81 (the first fixing devices of the present application) provided at the peripheral edge of the base plate 11 and multiple second fasteners 85 (the second fixing devices of the present application) provided on the inner side of the multiple first fasteners 81.

Since the lens shifting unit 10 is fixed to the projector body 2 by the attachment of the fixing components 80 at the peripheral edge and the inner side of the base plate 11 as described above, bending of the base plate 11 that occurs when a large lens is used can be effectively reduced with a simple structure.

The fixing components 80 may be screws or the like, for example; however, they are not limited to this form and any well-known fixing device capable of fastening between members can be used as appropriate.

As shown in FIGS. 3 and 8, the first fasteners 81 are inserted through first through-holes 11a, 11a, 11a, 11a formed substantially at the four corners of the base plate 11 to fasten the base plate 11 and the casing 2a to each other.

As shown in FIG. 3, the first through-holes 11a are formed such that they are visible when seen from above in a situation where the first to third guiding drive mechanisms 50A-50C are at a home position of the lens 5 (hereinafter referred to as "home position"). This allows easy manipulation of a tool during an operation for replacing parts of the lens shifting unit 10.

It is noted that the home position refers to the position at which the lens shifting unit 10 supports the lens 5 in its stationary state (the origin position of the lens).

The first through-holes 11a are also formed with an offset in order to provide them outside a range of movement by the first to third guiding drive mechanisms 50A-50C from the home position when seen from above. This allows manipulation of a tool and easy removal of the first fasteners even in a situation where the lens is shifted in the three, or X-, Y-, and Z-axis, directions from the home position. Thus, an operation for replacing parts of the lens shifting unit 10 can be easily performed.

The second fasteners 85 are inserted through second through-holes 11b, 11b formed in the base plate 11 on the inner side of the linear guiding unit 60A to the right and left of the first guiding drive mechanism 50A, thereby fastening the base plate 11 and the casing 2a to each other as shown in FIGS. 3, 8 and 9.

Figure 10A:
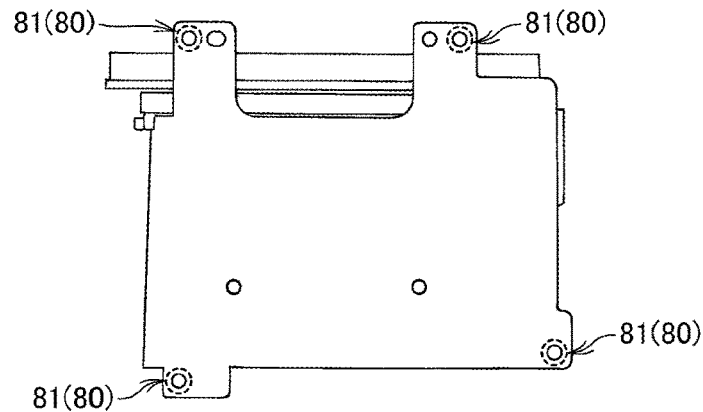
FIGS. 10(A) to 10(C) show examples of FEM analysis of the amount of displacement of components for a fixing form of a conventional lens shifting unit.
Figure 10B:
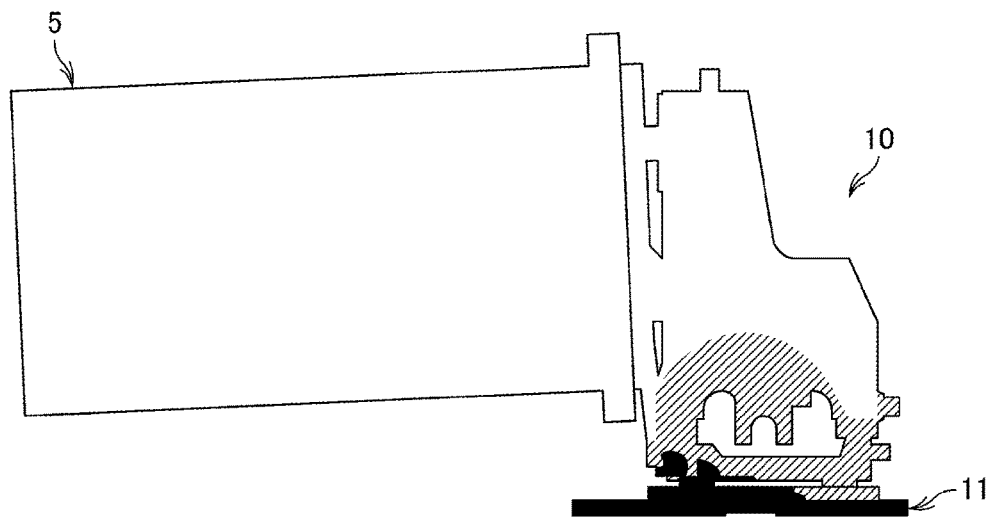
Figure 10C:
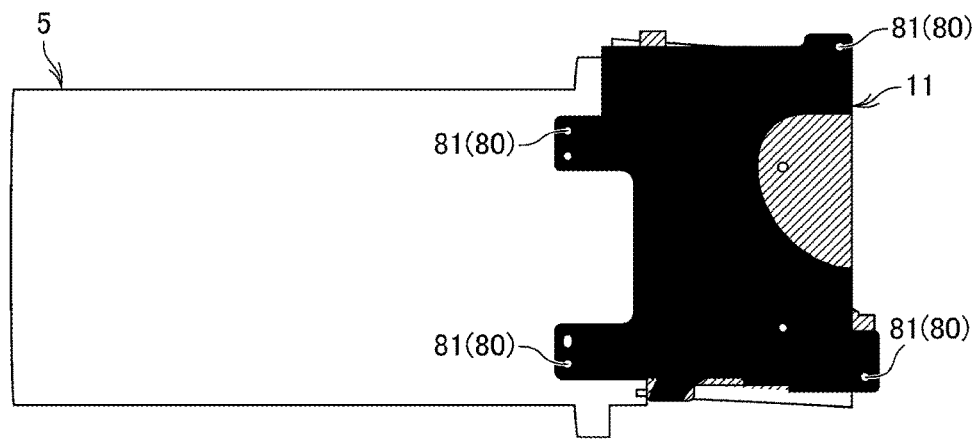
Figure 11A:
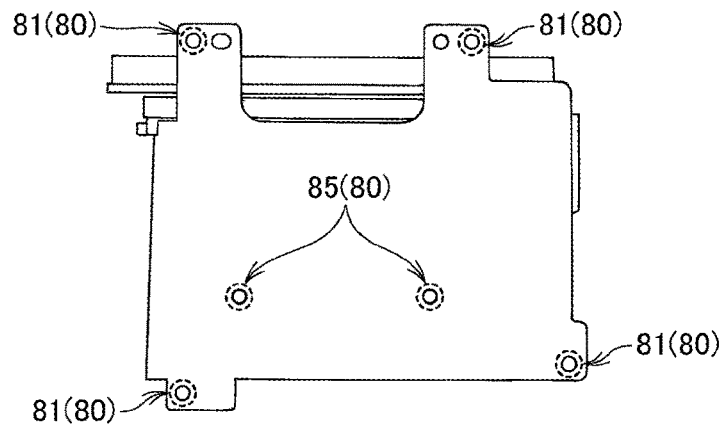
FIGS. 11(A) to 11(C) show examples of FEM analysis of the amount of displacement of components for the fixing form of the lens shifting unit according to the embodiment.
Figure 11B:
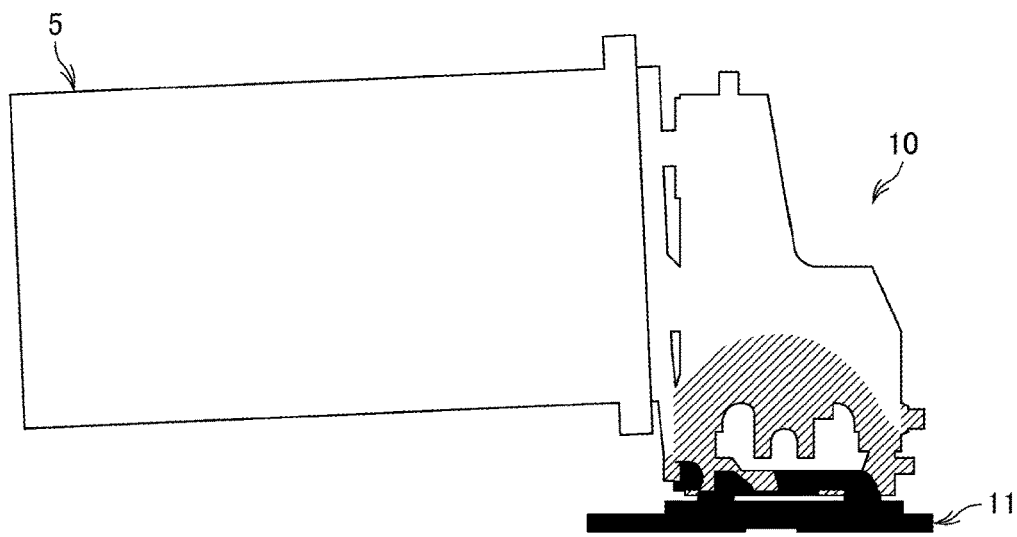
Figure 11C:
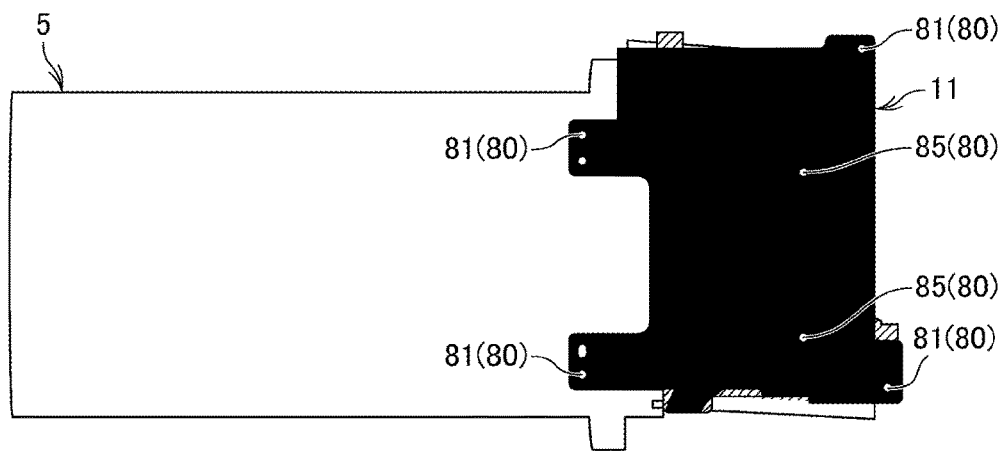

FIGS. 10 and 11 show an example of verifying the amount of displacement of components by FEM analysis for different fixing forms of the lens shifting unit 10 when a large lens 5 is attached. The difference between the fixing form for a conventional lens shifting unit and that of the present invention is that the fixing form of the conventional lens shifting unit 10 fixes it to the projector body 2 only at four locations in the peripheral edge of the base plate 11, whereas the fixing form of the lens shifting unit 10 according to this embodiment fixes it to the projector body 2 at four locations in the peripheral edge of the base plate 11 and two locations on the inner side thereof, as shown in FIGS. 10(A) and 11(A).

In FIGS. 10(B), (C) and FIGS. 11(B), (C), filled areas indicate areas in which no displacement occurs in components, and white areas and hatched areas indicate areas in which displacement occurs in components due to self-weight. As seen from FIGS. 10 and 11, displacement occurs particularly in the inner side of the base plate 11 with the fixing form of the conventional lens shifting unit 10, while no displacement occurs in the base plate 11 with the fixing form of the lens shifting unit 10 according to this embodiment.

It has thus been verified that fixation only at the peripheral edge of the base plate 11 tends to incur bending inside the base plate 11. Accordingly, bending that occurs in the base plate 11 can be effectively reduced by attaching the second fasteners 85 on the inner side of the base plate 11 as mentioned above.

In addition, the second through-holes 11b are disposed on the rear inner side of the base plate 11 because it was confirmed that bending occurred on the rear inner side of the base plate 11 as a result of conducting the aforementioned verification for the case of placing the projector apparatus on a floor.

In a case where the projector apparatus is hung from a ceiling, bending would possibly occur on the front inner side of the base plate 11. Accordingly, the second through-holes 11b will be formed on the front inner side of the base plate 11 and the second fasteners 85 will be attached using the second through-holes 11b.

As shown in FIG. 9, for effective reduction in the bending of the base plate 11, the second through-holes 11b are formed on the inner side of the linear guiding unit 60A of the first guiding drive mechanism 50A and of the linear guiding unit 60B of the second guiding drive mechanism 50B in a situation where the first and second guiding drive mechanisms 50A, 50B are at the home position. More specifically, each second through-hole 11b is formed at a position of intersection between a line extended in the X-axis direction from the position at which the movement block 102 of the linear guiding unit 60A of the first guiding drive mechanism 50A is fixed and a line extended in the Y-axis direction from the position at which the movement block 102 of the linear guiding unit 60B of the second guiding drive mechanism 50B is fixed in a situation where the first and second guiding drive mechanisms 50A, 50B are at the home position.

Also, as shown in FIGS. 2 and 3, through-holes 27, 35 are formed in the first intermediate member 26 and in the bottom wall portion 31a of the second intermediate member 30 in order to create a space that allows manipulation of a tool for attaching or detaching the second fasteners 85 from above in a situation where the first to third guiding drive mechanisms are at the home position. This allows easy manipulation of a tool during an operation for replacing parts of the lens shifting unit 10 and facilitates the operation for replacing parts of the lens shifting unit 10.

The through-hole 35 has a size including the range of movement by the first to third guiding drive mechanisms 50A-50C from the home position when seen from above. This enables manipulation of a tool via the through-hole 35 and allows for easy removal of the second fasteners 85 even in a situation where the lens shifting unit is shifted in the three, or X-, Y-, and Z-axis directions from the home position. Thus, an operation for replacing parts of the lens shifting unit 10 can be easily performed.

It is noted that the present invention is not limited to the above embodiment but may be modified in various manners within a range not altering the gist of the present invention. For example, although through-holes are formed in the first intermediate member and the second intermediate member in the above embodiment, a space for manipulating a tool may be formed by cutting this portion from the back side. This would provide a space for allowing manipulation of a tool above the second fasteners 85, thus permitting easy attachment and detachment of the second fasteners 85 and facilitating an operation for replacing parts of the lens shifting unit 10.

Also, the number and positions of the first fasteners 81 and the second fasteners 85 are both not limited but may be modified as appropriate.

Additionally, the structure of the guiding drive mechanism 50 shown in the above example is only illustrative and other well-known guiding drive mechanisms may be employed as appropriate.

REFERENCE NUMERALS 2 projector body
5 lens
10 lens shifting unit
11 base plate
50 guiding drive mechanism
80 fixing component
81 first fastener
85 second fastener
35 through-hole

The invention claimed is:
1. A projector apparatus comprising:
a base plate attached inside a projector body;
a lens supporting unit attached to the base plate and supporting a projection lens so as to be movable relative to the base plate;
guiding mechanisms for guiding the lens supporting unit so as to be freely movable in a horizontal direction and a normal direction relative to the base plate; and
fixing devices which fix the base plate to the projector body,
wherein the fixing devices comprise:
a plurality of first fixing devices provided at peripheral edges of the base plate; and
second fixing devices provided on an inner side of the plurality of first fixing devices, and wherein the guiding mechanisms for guiding the lens supporting unit so as to be freely movable in the horizontal direction comprise:

a guiding mechanism for guiding the lens supporting unit so as to be freely movable in an optical axis direction of the projection lens; and a guiding mechanism for guiding the lens supporting unit so as to be freely movable in a left/right direction of the projector apparatus.

2. The projector apparatus according to claim 1, wherein the lens supporting unit is positioned overlapping with the base plate; and the lens supporting unit has through-holes formed therein for manipulation of the second fixing devices for attachment and detachment thereof.

3. The projector apparatus according to claim 1, wherein the first fixing devices are provided outside a movement range of the lens supporting unit.

4. The projector apparatus according to claim 2, wherein the first fixing devices are provided outside a movement range of the lens supporting unit.

* * * * *

UNITED STATES PATENT AND TRADEMARK OFFICE
CERTIFICATE OF CORRECTION

PATENT NO. : 10,859,895 B2  
APPLICATION NO. : 16/474223  
DATED : December 8, 2020  
INVENTOR(S) : Marie Shimamura et al.

It is certified that error appears in the above-identified patent and that said Letters Patent is hereby corrected as shown below:

On the Title Page

Change:  
(73) Assignee: THK CO., LTD., Tokyo (JP); NEC DISPLAY SOLUTIONS, LTD., Tokyo (JP) Osaka-shi (JP)

To be:  
(73) Assignee: THK CO., LTD., Tokyo (JP)

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*